United States Patent [19]

Vlahos

[11] Patent Number: 4,625,231
[45] Date of Patent: Nov. 25, 1986

[54] COMPREHENSIVE ELECTRONIC COMPOSITING SYSTEM

[75] Inventor: Petro Vlahos, Redway, Calif.

[73] Assignee: Ultimatte Corporation, Reseda, Calif.

[21] Appl. No.: 604,637

[22] Filed: Apr. 27, 1984

[51] Int. Cl.$^4$ ............................................. H04N 9/74
[52] U.S. Cl. ..................................................... 358/22
[58] Field of Search ....................... 358/22, 183, 81, 82

[56] References Cited

U.S. PATENT DOCUMENTS

| | | | |
|---|---|---|---|
| 3,595,987 | 7/1971 | Vlahos | 358/22 |
| 4,007,487 | 2/1977 | Vlahos | 358/22 |
| 4,100,569 | 7/1978 | Vlahos | 358/22 |
| 4,344,085 | 8/1982 | Vlahos | 358/22 |
| 4,396,939 | 8/1983 | Kitahama | 358/22 |
| 4,409,611 | 10/1983 | Vlahos | 358/22 |

OTHER PUBLICATIONS

Nakamura and Kamakura, *High Quality Montage Pictures by a New Color Killer Soft Chromakey System*, SMPTE Journal, vol. 90, Feb., 1981, pp. 107-112.

*Primary Examiner*—James J. Groody
*Assistant Examiner*—Michael P. Dunnam
*Attorney, Agent, or Firm*—Blakely, Sokoloff, Taylor & Zafman

[57] ABSTRACT

In the present invention, certain improvements are incorporated that permit removal of the backing color when its illumination is of non-constant color. In addition, an improved color logic is described that improves the simultaneous reproduction of fleshtones and green foliage in the same scene. A modified control logic is described that improves reproduction of red objects and fleshtones. A reversed window permits retention of objects whose color is identical to that of the backing. And, finally, a circuit is described which permits a super-imposing of titles or glow where said titles or glow may be made wholly transparent, semi-transparent or opaque.

33 Claims, 4 Drawing Figures

COMPREHENSIVE ELECTRONIC COMPOSITING SYSTEM

BACKGROUND

The linear FG and BG compositing system of the blue screen type has been described in my prior U.S. Pat. Nos. 3,595,987; 4,007,487; 4,100,569; 4,344,085; 4,409,611; and in a recent application (June 13, 1983) Ser. No. 520,067, which describes the origination and series of improvements in the compositing of video images using a linear technique.

This new technology combines the two images by first removing the color of the colored backing by a subtraction process, leaving the subject as though placed in front of a black backing. The background (BG) scene is then turned on in the area formerly occupied by the colored backing in proportion to the brightness and visibility of that colored backing. This proportional control of the BG scene permits the full and accurate retention of transparent and semi-transparent objects including smoke, fog, glassware, etc.

Since the foreground (FG) video is never subjected to a switching action, the ultimate resolution of the FG camera is retained in the composite scene. The aforementioned patents fully describe this technology, and are incorporated herein by reference. The process by which the color of the backing is removed is by subtraction and, as indicated in the above patents, may occur prior to encoding or subsequent to encoding.

BRIEF SUMMARY OF THE INVENTION

The present invention removes some of the problems encountered in the practical use of compositing equipment. One such problem relates to the removal of the colored backing.

The normal process is to subtract an anti-veiling voltage from the FG RGB video that is equal to the RGB video in the backing area, thus reducing the apparent video to zero. This procedure worked well when the backing was simply a vertical surface. However, when the backing consists of a vertical back wall with a curved cove transitioning to a blue floor, it will always be observed that the blue floor and cove, because of their angular difference to the camera as compared to the back wall, will have higher amounts of green and red Thus, the antiveiling voltage, which causes the vertical back wall to become black, leaves a residual gray field in the flooring area and, sometimes, a bright line in the cove area. It was, therefore, necessary to increase the anti-veiling voltage being subtracted from the FG video until the floor area became black, i.e. zero video. However, the amount of anti-veiling voltage required for the floor area exceeds that voltage which would be required from the vertical wall area. The result is that the vertical wall area is now below zero, resulting in a slightly darkened edge around that part of the subject in front of the vertical wall. The dark edge is, of course, undesirable.

A further problem arises when a blue set piece is placed upon the blue stage at some angle that may be neither parallel to the floor or the back wall. This set piece will exhibit a slightly different set of RGB levels and, thus, require different antiveiling voltages than does the floor or back wall.

These problems are overcome in this invention by creating first a set of anti-veiling voltages which are automatically adjusted to the blue of the vertical back wall. This first condition ignores the floor area which is, of course, necessary for situations in which the floor is flooded with fog or smoke or other semi-transparent media.

The first set of anti-veiling voltages are re-established once per field. A second set of anti-veiling voltages is selected by switch action in which the anti-veiling voltages are readjusted once per line. This once per line adjustment achieves a black for the back wall; changes sufficiently to create a black for the cove area, and changes further to create a black for the floor area.

On every line of video, the anti-veiling voltage is properly adjusted to achieve an exact zero video for all areas of the backing, without going below zero or being cut off by a zero clip. Thus, the back wall is, ideally, at its zero value; and does not create a black edging; and subjects in the floor area are also at zero video, which eliminates the light gray veiling that normally exists on the blue floor.

A third control of veiling is introduced which adjusts the anti-veiling voltage, instantaneously and continuously, along each scan line, resulting in the complete removal of flats and other blue set objects that are not continuous across the field. The instantaneous anti-veiling adjustment is not used when it is desired to retain smoke, fog or haze. A full description of the preferred embodiments is described in the detailed description section.

Another feature of this invention is an improvement of the blue logic. While the previous devices in the references provided, in general, excellent results, one problem occurred when attempting to reproduce people walking through a garden filled with green plants placed before a blue backing. It was possible to reproduce fleshtones with no hint of blue tint from the backing, but the green plants all turned a cyan color; if the device was reconnected for proper reproduction of green plants, without any trace of blue tint, then fleshtones took on a magenta tint.

In the present invention, the blue logic has been modified so that one may reproduce fleshtones and green colors in the same scene without discoloration from the blue backing.

Another aspect of the invention is an improvement in the control signal $E_c$. It is a function of the control signal to become zero in the subject area and to become unity in the fully illuminated backing area. The simplest equation for $E_c$ is $E_c = B - K(G/R)^{Hi}$. The $(G/R)^{Hi}$ represents, at any given instant, the larger of green or red. If we consider that fleshtones have values of typically 0.3 for blue, 0.32 for green, and 0.7 for red, it will be seen that in the equation blue minus $K(G/R)^{Hi}$, increasing the value of K will cause $E_c$ to reach zero for fleshtones sooner than for white for example, where G and R are equal. Thus, when $E_c$ is zero for white, $E_c$ is well below zero for fleshtones and red colors, which causes a slightly dark edging around faces.

In the present invention, the $E_c$ equation has been modified such that the first terms of the equation are $E_c = B - K(G/K_2R)^{Hi}$. The independent control $K_2$ allows reds and fleshtones to be separately adjusted from white or cool colors. Thus, it is possible to make $E_c$ zero for both whites and fleshtones without either going below zero. This function eliminates the tendency toward edgedarkening on people's faces.

Another aspect of this invention is the use of a reversed window which solves the problem of isolated blue objects becoming transparent. In a close-up, for example, a person with very blue eyes will have relatively low G/R content in the eyes, and the BG scene tends to show through. Likewise, in a car commercial, chrome hubcaps will reflect the blue of the blue floor, causing the appearance of a hole through which the BG scene is visible.

A reversed window is provided which sets four independent edges or other shape to encompass the blue object. It is the function of the reversed window to shut off the BG scene within the window area. Thus, the BG scene does not thereafter show through such blue objects.

A further aspect of this invention is to retain or remove the anti-veiling voltage within the reversed window. If the antiveiling voltage remains, then the color of the blue object tends to become gray or black. If the anti-veiling voltage is shut off within the reversed window, then the original color of the blue object is retained. In either case, the internal colorizer may be used to heighten, change or replace the color of the blue object within the reversed window.

Another aspect of this invention is a control circuit that allows the introduction of an external signal representing a title or other signal where said title is superimposed over the entire scene or behind the object being composited. While such superimposition of titles is now done in various other equipment(s), the unique combining technology utilized in applicant's invention permits such titles to be placed in the scene as totally transparent and self-luminous. The transparency is controllable from fully transparent to semitransparent to fully opaque.

When an out-of-focus image of the subject is inserted into this circuit, it causes the subject to appear to glow, and said glow may be fully transparent and self-luminous; i.e. the luminous glow is added to existing levels of signal representing the subject.

The diagram of FIG. 1 illustrates a compositing device employing three FG video channels (RGB) and three BG video channels (RGB). The device, as illustrated, is adequate for video cameras or other devices having an RGB output.

A fourth FG channel and a fourth BG channel may be added to accommodate video devices such as telecine film scanners, and some cameras employing a luminance channel. The addition of the fourth channel is accomplished by essentially duplicating the red channel. It is also practical to insert an encoded (NTSC/PAL) signal into the three BG channels so that one may composite a scene whose BG is on tape. Other formats such as YIQ or Y R−Y B−Y may be employed for either or both of the FG and BG channels when converted to the RGB form.

Although the discussion, diagrams and equations generally refer to the backing as blue, the backing may also be green or red. Thus, in any equation using the letters RGB, B represents the dominant color that one observes, while R and G represent secondary amounts of the other two primaries which generally accompany a primary color. The blue clamp logic and the control signal $E_c$ logic function equally well for backing colors of blue, green or red.

DETAILED DESCRIPTION

Figure 1:
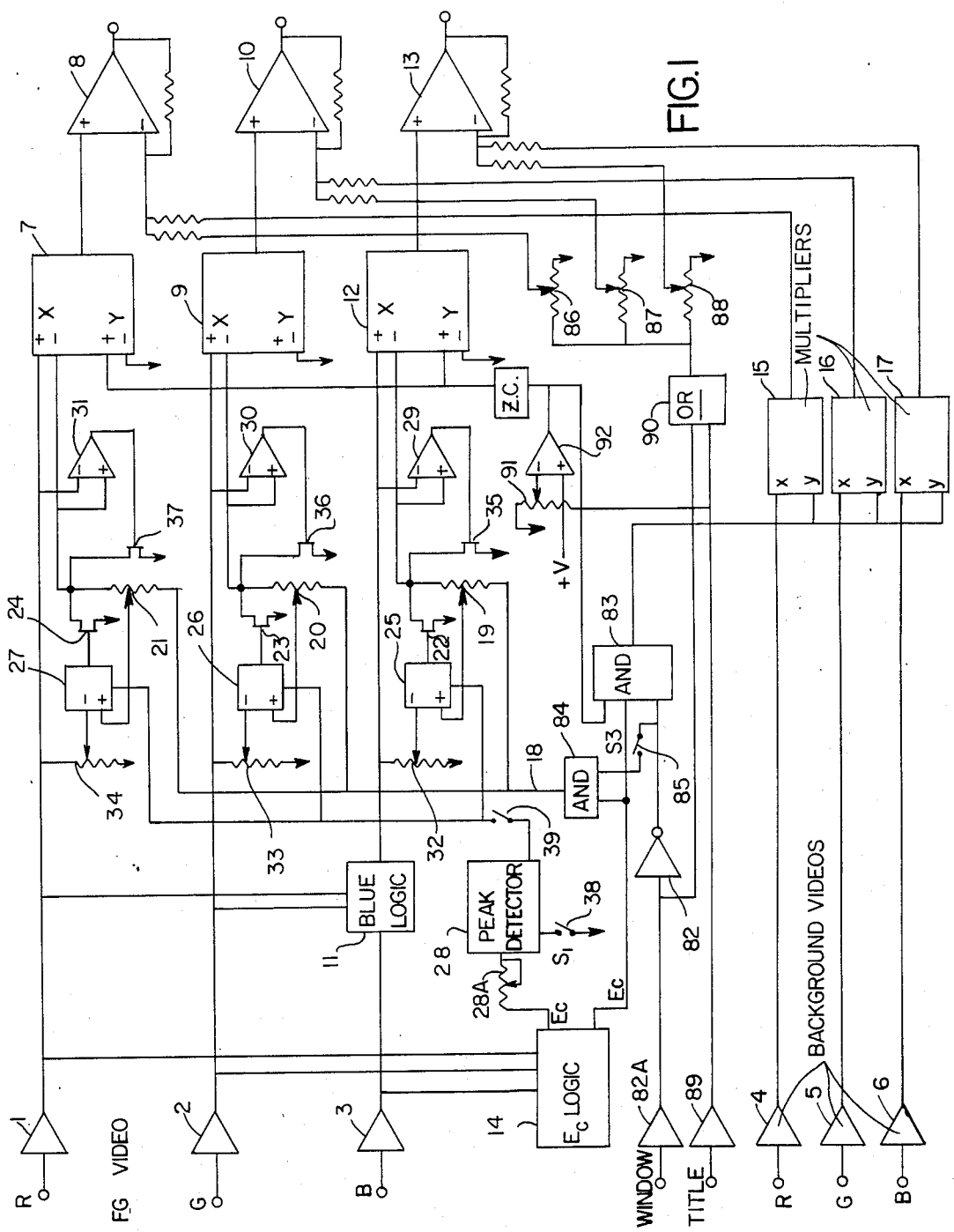
FIG. 1 is a schematic diagram of a circuit for implementing the subject invention.

A block diagram of the compositing system is shown in FIG. 1. Foreground RGB (Red, Green, Blue) video is connected to amplifiers 1, 2 and 3. Background red, green and blue video is connected to amplifiers 4, 5 and 6. Foreground red video from amplifier 1 goes directly to multiplier 7, then to output additive mixer 8. Green video is connected from amplifier 2 directly to amplifier 9, then to output additive mixer 10. The blue video is connected from amplifier 3 to the blue logic circuit 11, then to multiplier 12, then to output mixer 13. It is the function of the blue logic circuit 11 to limit the blue of the FG scene according to the blue logic equation which is described later. The FG red, green and blue video signals are connected to logic circuit 14 which develops the control signal $E_c$, according to the $E_c$ logic equation to be described later.

The RGB BG video is connected from amplifiers 4, 5 and 6 directly to multipliers 15, 16 and 17 whose outputs are connected to mixer amplifiers 8, 10 and 13. The control signal $E_c$ of 14 is connected to the Y input of multipliers 15, 16 and 17, and controls the level of RGB BG video from zero to unity as a direct and linear function of $E_c$. $E_c$ is connected via line 18 to resistors 19, 20 and 21 to provide anti-veiling voltages to the negative input of the X input of multipliers 7, 9 and 12.

The full value of $E_c$ is, of course, excessive for this purpose and is reduced by the shunting action of FET (Field Effect Transistor) 22 on resistor 19; of FET 23 on resistor 20; of 24 on resistor 21. The action of the shunting FETs 22, 23 and 24 is controlled by the combined comparator and sample and hold circuits 25, 26 and 27.

The action of the comparators in 25, 26 and 27 is to compare the existing RGB video with the supplied $E_c$, and to adjust the level of the supplied $E_c$ by means of shunting FETs 22, 23 and 24, to cause the video voltage and the adjusted $E_c$ voltage (anti-veiling voltage) to be equal at the X input of multipliers 7, 9 and 12. With equal levels of signal into the plus and minus input of these multipliers, there is zero output and thus all residual red, green or blue in the colored backing is automatically reduced to zero.

Sample and hold circuits 25, 26 and 27 and their internal comparators do not work continuously; rather, they sample the FG RGB video only at such times as the peak detector 28 provides a pulse to the clock input of the sample and hold device. The peak detector 28 has a time constant such that it detects the peak $E_c$ in a video field once per field. Thus, the anti-veiling voltage is updated once per field and applies to the entire field. The closing of switch $S_1(38)$ causes a change of the peak detector's time constant, so that a clock pulse is provided once per line. Thus, the anti-veiling voltages are reset on each line.

Operational amplifiers 29, 30 and 31 can provide instantaneous and continuous readjustment of the anti-veiling voltage when the wiper arm(s) of potentiometers 32, 33 and 34 are lower than the wiper arm(s) of potentiometers 19, 20 and 21. When the levels out of potentiometers 32, 33 and 34 are lower than the settings of potentiometers 19, 20 and 21, then the comparator within sample and hold circuits 25, 26 and 27 will provide a negative output, causing FETs 22, 23 and 24 to reduce their shunting action across resistors 19, 20 and 21. The voltage level at the top of resistors 19, 20 and 21 will therefore rise; this higher level into the positive input of amplifiers 29, 30 and 31 will exceed the video level into the negative input of amplifiers 29, 30 and 31. The output of amplifiers 29, 30 and 31 will thus become more positive, and FETs 35, 36 and 37 will now shunt resistors 19, 20 and 21 to maintain an antiveiling level equal to the video level. Thus, amplifier 29 and shunt 35 perform the same function as sample and hold 25 and FET 22 in their shunting action across resistor 19. The difference, however, is that the shunting action of amplifier 29 and FET 35 is continuous and instantaneous. Amplifier 29 is selected to handle frequencies at least as high as the video rate, i.e. at 5 mHz or more.

When the potentiometer wipers 32, 33 and 34 move upward so as to be higher than the settings of potentiometers 19, 20 and 21, the action of instantaneous circuits 29, 30 and 31 are terminated; and one will begin to observe a trace of veiling over the BG scene.

The manual control of potentiometers 32, 33 and 34 permits the introduction of veiling and the introduction of the color of veiling to more realistically reproduce fog and smoke or desired reflections.

Switch $S_2(39)$ opens the clock circuit to sample and hold devices 25, 26 and 27. These circuits retain the anti-veiling voltage existing at the time switch $S_2(39)$ is opened. This action makes possible the retention of a desired anti-veiling voltage during such periods as the camera may pan off and onto the blue backing.

Figure 2:
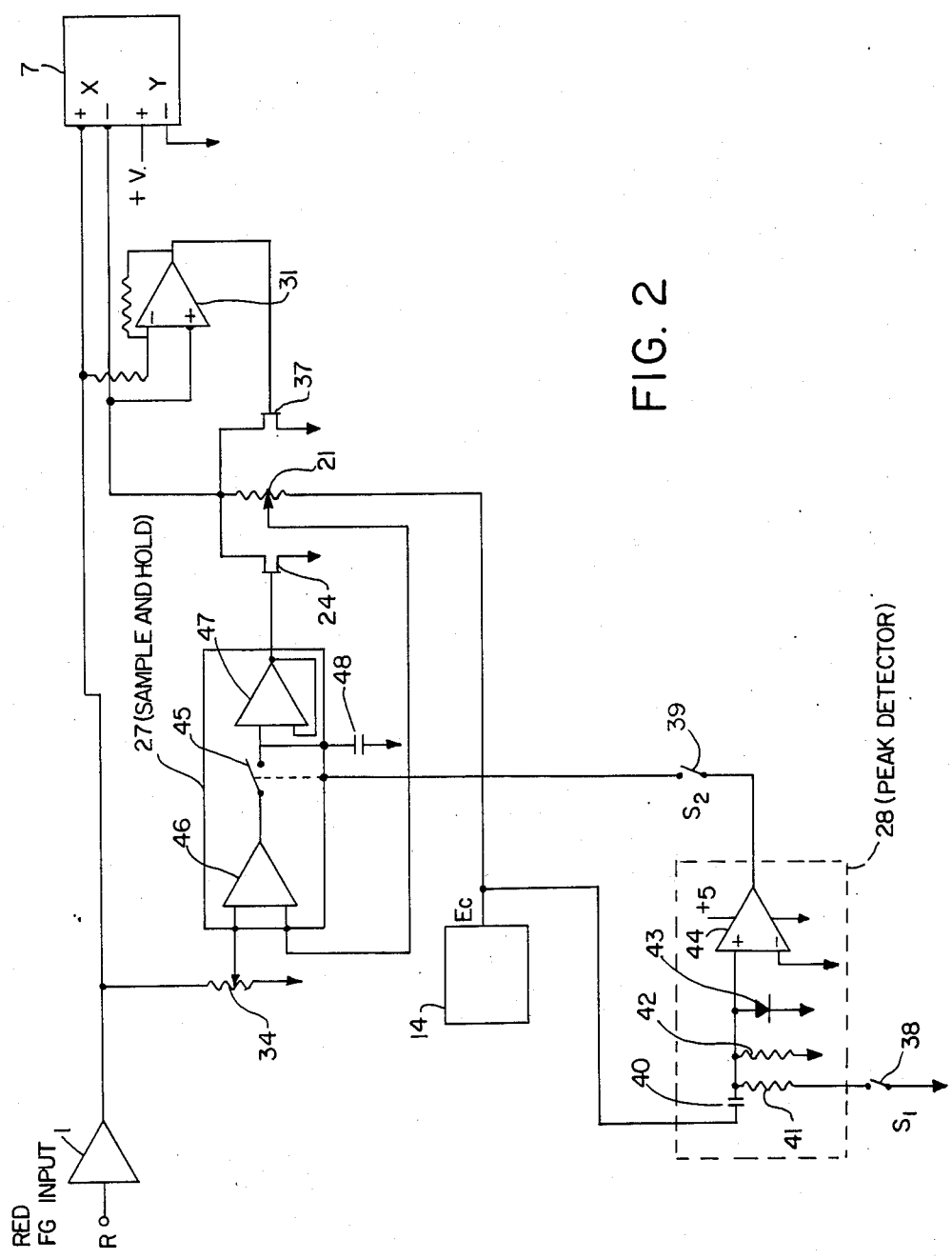
FIG. 2 is a schematic diagram showing the details of the peak detector and sample and hold circuits of the present invention.

The functions of anti-veiling circuits are more clearly explained in conjunction with FIG. 2, which illustrates the peak detector 28 and the automatic anti-veiling circuits for the red FG channel. Referring now to FIG. 2, the peak detector 28 consists of coupling capacitor 40, discharge resistors 41 and 42, diode 43, and comparator 44. When $E_c$ is high, capacitor 40 charges through diode 43 to the peak $E_c$ and causes the comparator to exhibit a plus 5 volt output. When $E_c$ is lower than its peak, the output from the comparator is zero. The two states, high and low, represent a clock which acts to close switch 45 in the sample and hold device 27. The time constant of capacitor 40 and resistor 42 is such that a new clock pulse is established not more often than once per field.

When $S_1(38)$ is closed, the time constant of capacitor 40 and resistors 41 and 42 are such that a clock pulse is established not more often than once per line and not less than once per two lines. Control 28A limits the amount of voltage change on capacitor 40 during one line of video.

The peak detector 28 shown in FIG. 2 operates the sample and hold devices 25, 26 and 27. While not shown, a fourth channel is often applied to carry a luminance signal. The sample and hold device 27 in conjunction with FET 24 and resistor 21 regulates the $E_c$ level at the top of resistor 21 such that the inputs to the X input of multiplier 7 are equal and therefore result in zero output.

Sample and hold 27, together with FET 24 and potentiometers 21 and 34 automatically provide complete removal of the video representing the colored backing in each FG channel. Potentiometers 21 and 34 are provided to permit the comparator 46 to automatically set the anti-veiling voltage to some value greater than or less than the RGB video. When the anti-veiling voltage is less than the RGB video, some veiling remains. This may be done by reducing the signal from potentiometer 34 or by increasing the signal from potentiometer 21. As long as the anti-veiling voltage is less than the RGB video, amplifier 31 has a negative output which causes FET 37 to open, thus effectively eliminating the function of amplifier 31. However, when the anti-veiling voltage is greater than the RGB video, the net difference of video delivered to multiplier 7 will be negative; but when anti-veiling voltage is greater than RGB video, the output of amplifier 31 goes toward the positive, causing FET to reduce its resistance, thus bringing the anti-veiling voltage back to a value that equals RGB video. When the red video rises suddenly, as when encountering a blue flat on the set, amplifier 31 acts instantaneously to prevent it. The range of action of amplifier 31 is limited to the signal difference established by potentiometers 21 and 34.

The unique importance of the instantaneous anti-veiling circuit is that the elimination of the color components of the blue backing are brought just to zero and held there even though the instantaneous values of RGB at any given point may change by different amounts. Pictorially, this means that in spite of non-uniform color of the backing or various shades of blue used in the backing components, color removal in all areas goes just to zero but not below zero, and thus no edging occurs on FG subjects anywhere in the scene. While it was always possible to remove the color of various set pieces by employing excessive anti-veiling voltage, the consequence of doing so was the dark edging on FG subjects.

DISCUSSION OF IMPROVED $E_c$

The $E_c$ control signal logic is improved by making the red and green adjustments independent of each other in the logic equations $E_c = B - K_g G$ and $E_c = B - K_r R$. Independent control allows $E_c$ to become zero for white subjects in the equation $E_c = B - K_g G$ by using the full value of G. For fleshtones, $E_c$ will be zero in $E_c = B - K_r R$ when $K_r R$ is only at half the level of $K_g G$ since fleshtones normally contain red that is twice the level of blue.

By making both $B - k_g G$ and $B - K_r R$ just equal to zero, any tendency toward a dark edge on fleshtones is eliminated. Since the ratio of red to blue in fleshtones is essentially constant, one may set $K_2$ to reduce red to half level. Potentiometers $K_r$ and $K_g$ may then be ganged to a single control; thus in normal operation only one control need be used.

Another feature of the improved $E_c$ logic is the elimination of the interaction between the glare/noise control 71 and the level of $E_c$. Heretofore, the control 71, when operated, caused a reduction of $E_c$ which, in turn, required readjustment of several other controls dependent upon $E_c$.

Figure 4:
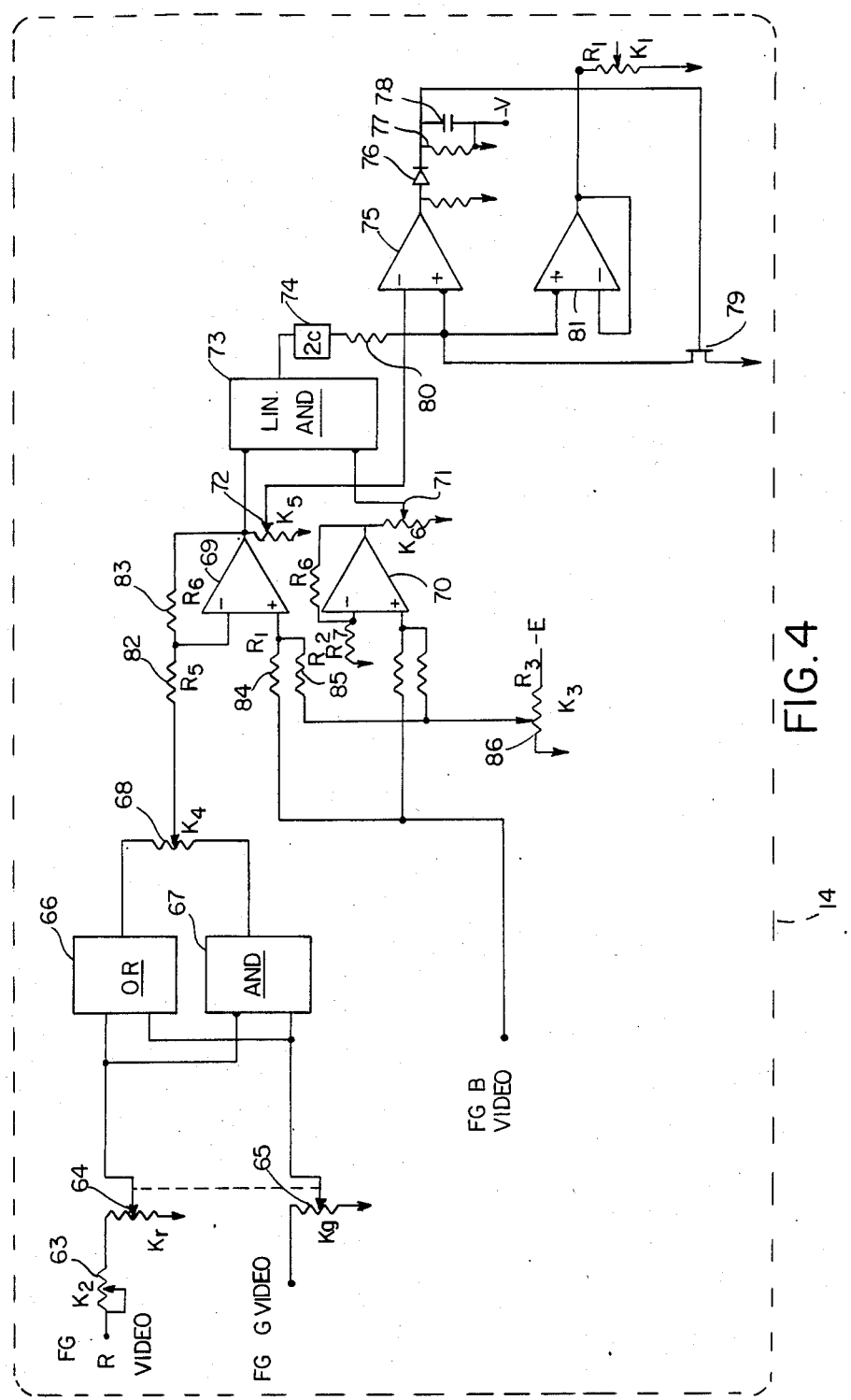
FIG. 4 is a schematic diagram showing the details of the control signal logic circuitry of the present invention.

The circuit of FIG. 4 permits operation of the glare/noise control 71 without affecting the level of $E_c$. This is accomplished by connecting the output of $E_c$ zero-clip 74 to the dropping resistor 80. A portion of the basic $E_c$ signal is tapped off with potentiometer 72 and is connected to comparator 75. Integration components 76, 77 and 78 cause field effect transistor 79 to load dropping resistor 80 and reduce $E_c$ into amplifier 81 to the level of the $E_c$ signal tapped off of potentiometer 72.

This reduced $E_c$ level at 72 is typically reduced by the amount of the camera noise (i.e. $E_c$ at 72 will be 80% of $E_c$ at output of 69).

When the blue signal from $K_6$ (71) into AND gate 73 is less than the signal from 69, the output of 73 will consist of the signal from 71. Since the $E_c$ signal from 74 is now equal to the $E_c$ signal from 71, it will drop as $K_6$ (71) is reduced. However, the comparator 75 and FET 79 will continually readjust and hold $E_c$ into 81 constant until the signal from $K_6$ (71) is lower than the signal from potentiometer 72. Thus, $K_5$ (72) sets the desired range limit through which $K_6$ (71) may be operated without affecting the level of $E_c$ at the output of 81.

The circuit of FIG. 4 generates control signal $E_c$ from the FG scene color components red, green and blue (RGB). This signal may be expressed in the form of an equation.

The red video into 66 and 67 is $K_2 K_r R$. The green video signal into 66 and 67 is $K_g G$. The output of $K_4$ (68) is a function of red and green;

$$f(R/G) = K_4(K_2 K_r R \text{ OR } K_g G) + (1 - K_4)(K_2 K_r R \text{ AND } K_g G) \tag{1}$$

This signal $f(R/G)$ is connected to the negative input of amplifier 69.

The blue video signal is connected to the positive input of operational amplifier 69 through proportioning resistor consisting of 84, 85 and that portion of $K_3$ (86) between the wiper arm and ground. The blue signal at the output of amplifier 69 in the absence of $f(R/G)$ will be $E_b$ and is expressed as;

$$E_b = \left[1 + \frac{R_6}{R_5}\right] \left[\frac{R_2 + K_3 R_3}{R_1 + R_2 + K_3 R_3}\right] - K_3 V \tag{2}$$

When $E_b$ is combined with $f(R/G)$ in amplifier 69, its output into AND gate 73 will be the control signal $E_c$:

$$E_c = E_b - f(R/G) \tag{3}$$

In equation (3), V is chosen so that when B has a value representing the blue backing, $E_b$ is unchanged for all values of $K_3$.

It should be noted that the $E_c$ equation is linear when $K_3$ is zero. As $K_3$ is increased, a portion of the control range of $E_c$ becomes non-linear.

The output of amplifier 70 will be $B_c$, and is identical to $E_b$ expressed in equation (2).

The output of AND gate 73 will be $$E_c = E_b - f(R/G) \text{ AND } K_6 B_c \tag{4}$$

At such time as the output of $K_6$ (71) is less than the output of amplifier 69, the AND gate eliminates $E_b - f(G/R)$ and the output of 73 and 81 will consist solely of $K_6 B_c$. The simple term $K_6 E_b$ contains significantly less noise than the sum of the terms of equation 1. When $E_c$ consists of $K_6 E_b$, shadows retain their density and shadow noise is essentially eliminated.

It should be noted that the control signal $E_c$ serves two purposes. It controls the level of the BG scene as a linear function of the brightness and visibility of the backing. Since the level of $E_c$ exactly follows the changes of brightness (and visibility) of the backing, it is the ideal source of signal to be used for subtracting to zero the color components of the backing.

BLUE LOGIC

In applicant's prior patents, the blue video signal was subjected to a dynamic blue clamp of the form $B = G + (G - R)^+ + (R - G)^+$. This blue clamp was effective in preventing blue flare from the blue backing from affecting the color of most FG subjects. Green foliage was an exception. The green leaves of a plant would turn to a cyan color. It was possible to reverse the green and red video cables, which would eliminate the discoloration of green plants but, unfortunately, people's faces would take on a magenta tint from the added blue from the blue backing.

In this invention, the blue logic is improved so that one may reproduce fleshtones and green foliage in the same scene without any evidence of discoloration caused by the blue backing.

Figure 3:
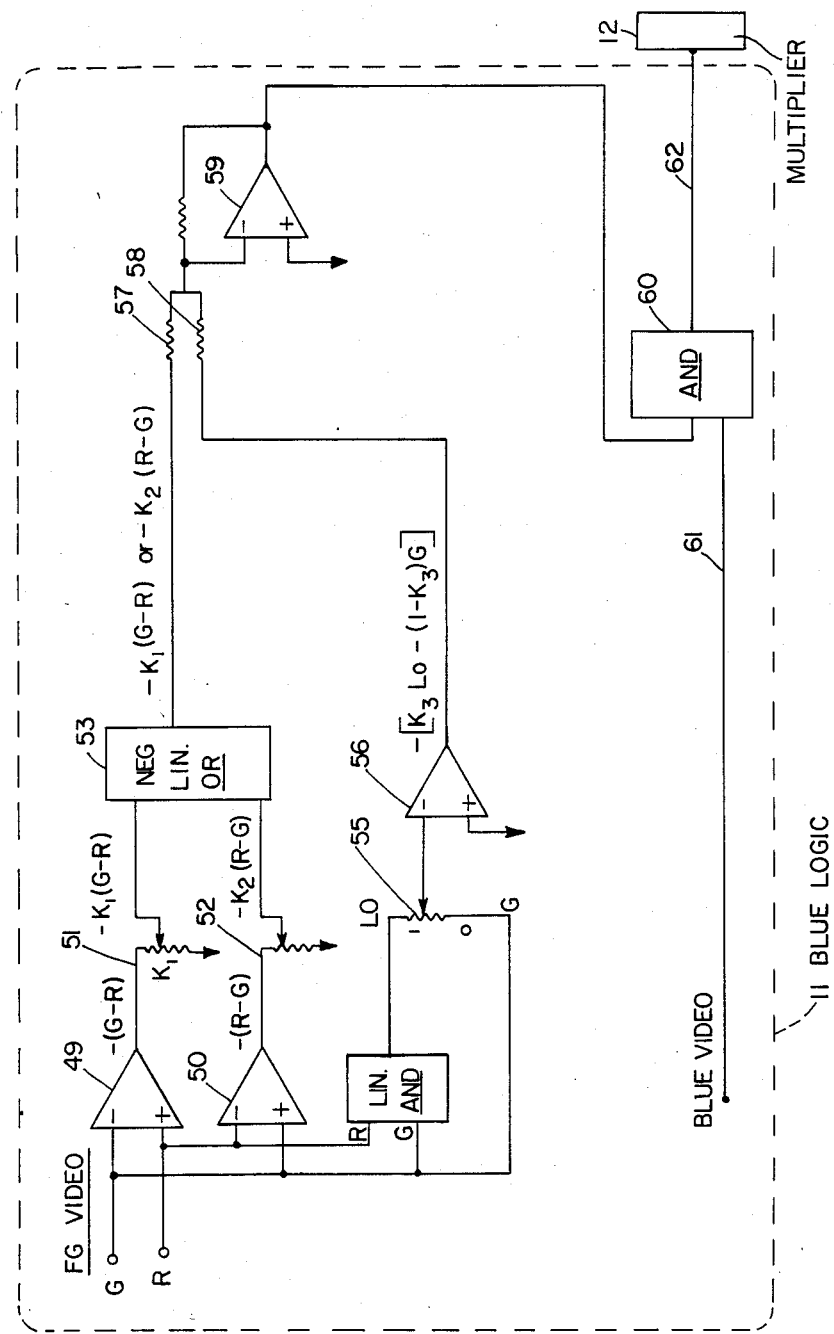
FIG. 3 is a schematic diagram showing the details of the blue logic circuitry of the present invention.

The improved blue logic is shown in FIG. 3. Linear AND gate 54 compares red and green, and provides as output the lower of the two signals to potentiometer 55. AND gate 54 and potentiometer 55 are the new elements of the improved blue logic.

When potentiometer is at its lower end, marked G, the blue logic may be expressed as $$B \leq G + K_1(G - R)^+ + K_2(R - G)^+ \tag{5}$$

However, when the potentiometer 55 is at its upper end, marked LO, the blue logic becomes $$B \leq (G/R)^{LO} + K_1(G - R)^+ + K_2(R - G)^+ \tag{6}$$

Teh term $(G/R)^{LO}$ indicates the lower of green or red.

The new blue logic imposes a wardrobe restriction, since blue and cyan wardrobe will be reproduced as green. This is not a significant limitation since these colors are normally avoided when using a blue backing. Potentiometer 55 permits partial access to the LO function, permitting satisfactory reproduction of fleshtones and foliage without undue color distortion of blue wardrobe.

REVERSE WINDOW

Referring to FIG. 1, the window input is reversed by 82 and connected into AND gate 83. When the output of 83 is zero, the BG turn-on signal ($E_c$) is held to zero, and BG multipliers 15, 16 and 17 provide zero output. The BG scene is thereby prevented from "printing-thru" a blue object when encompassed by the reversed window.

The window signal is simultaneously connected to OR gate 90 so that controls 86, 87 and 88 may insert any color into the formerly blue object. If $S_3$ (85) is closed, $E_c$ provides antiveiling voltages to the blue object, thus removing its blue color, rendering it gray or black.

The colorizer 86, 87, 88 may be used to insert a different color into the object whose blue has been removed.

TRANSPARENT GLOW OR TITLE

Referring to FIG. 1, a title or glow signal 89 is connected to OR gate 90 to activate the colorizer controls 86, 87 and 88. These controls will colorize the title any desired color including white. The signals from 86, 87 and 88 are superimposed over the scene, with or without a subject being composited. The title signals from 86, 87 and 88 are added to the video already existing at output summing amplifiers 8, 10 and 13. It is only by virtue of the fact that the title or glow signals are added to existing video that a true glowing appearance is created. There is no corresponding reduction of the video over which the title or glow is superimposed. The glow can be dimmed by controls 86, 87 and 88, but these controls do not affect transparency.

The title signal 89 is also connected to potentiometer 91 which connects to inverter 92 and then to FG video multipliers 7, 9 and 12. It is the function of the Y input to these multipliers to determine their output. Various levels of the glow signal 89 may be used by means of inverter 92 to reduce the level of the transparency of the title or glow. At such point as the FG and BG scenes are completely shut off (in the region of the title), the title becomes opaque. The BG scene is also reduced in level in the title area by connecting the inverted title signal from 92 to AND gate 83. During the operation of control 92, the mixing progresses from additive to non-additive mixing.

A subject can be made to glow by inverting the $E_c$ signal and displaying it on a monitor. A camera observing the monitor is thrown out of focus causing an enlarged out-of-focus shape. This camera signal constitutes the glow input signal.

Devices such as operational amplifiers, multipliers, sample and hold, and zero clips are circuit elements well known to those skilled in the art of electronics. Specific circuits for linear AND gates and OR gates are shown in the referenced patents.

Although the improvements represented by the automatic antiveiling circuits for field, line and continuous instantaneous adjustment is shown and described for a compositing device utilizing RGB/RGB as its FG and BG video inputs, these same improvements can be added to any compositing device whose removal of the backing colors is accomplished by a subtraction process. The subtraction may occur in the form of individual RGB signals or in the encoded form utilizing chroma and luminance to represent RGB signals.

Other improvements such as the blue logic, the $E_c$ logic and the non-interactive glow/noise control may be applied to all of the applicant's compositing devices described by the referred patents.

I claim:

1. The method of compositing color image video signals involving a foreground scene, a background scene and a foreground scene including a subject before a colored backing, and automatically and simultaneously reducing to zero the color components fo the backing when said color components in the vertical section of the backing are not of the same ratio as the color components of the horizontal section of the colored backing, comprising the steps of;
   (a) forming a control signal as a function of the brightness and visibility of the colored backing,
   (b) forming a gating pulse on each line of video identifying that portion of the foreground scene that constitutes a peak value of said control signal for each line of video,
   (c) comparing and automatically readjusting the level of the control signal on each line of video, to match the video level of each color component of the colored backing,
   (d) removing each color component of the backing by subtraction of the once per line automatically adjusting control signal from the foreground scene video signal, and
   (e) combining the foreground scene video signal, the color components of the backing thereof having been removed, with the background scene video signal, the level of which has been controlled by the control signal, to form a composite video image.

2. The method of claim 1, in which;
   the combining of the foreground and background scene video signals is accomplished by simple addition.

3. The method of claim 1, in which;
   the combining of the foreground and the background scene video signals is accomplished by non-additive mixing, wherein the foreground signal level is reduced as the background signal level is increased, and vice-versa.

4. The method of claim 1, in which; the function by which the control signal varies may be linear, partially linear, or non-linear with respect to the variations of illumination on the backing.

5. The method of claim 1, in which;
   the comparing of the automatically adjusted level of the control signal with the level of the color components of the backing occurs once for each line of video, and the automatic readjustment of the level of the control signal occurs only when the control signal fails to match the level of the color components of the backing.

6. The method of claim 1, in which;
   the foreground video signal is at full level throughout the entire video frame.

7. The method of compositing color image video signals involving
   a foreground scene including subject before a colored backing and a background scene and automatically and simultaneously reducing to zero the color components on a single scan line when said color components on one portion of a scan line are not of the same ratio as the color components on another section of the scan line when said scan line represents the colored backing, comprising the method steps of;
   (a) forming a control signal as a function of the brightness and visibility of the colored backing,
   (b) comparing and continuously and automatically readjusting the level of the control signal to match the video level of each color component of the colored backing,
   (c) removing each color component of the backing by subtraction of the automatically and continuously adjusted control signal from the foreground scene video signal, and
   (d) combining the foreground scene video signal, the color components of the backing along each scan line having been removed, with the background scene video signals the level of which has been controlled by the control signal, to form a composite video image.

8. The method of claim 7, in which;
   the combining of the foreground and background scene video signals is accomplished by simple addition.

9. The method of claim 7, in which;
   the combining of the foreground and the background scene video signals is accomplished by non-additive mixing, wherein the foreground signal level is reduced as the background signal level is increased, and vice-versa.

10. The method of claim 7, in which;

the function by which the control signal varies may be linear, partially linear or non-linear with respect to the variations of illumination on the backing.

11. The method of compositing color image video signals involving a background scene and a foreground scene including fleshtones and green foliage subjects before a blue backing and simultaneously eliminating discoloration on fleshtones and green foliage caused by the blue light from the backing, comprising the method steps of;
   (a) forming a control signal as a function of the brightness and visibility of the blue backing,
   (b) adjusting the control signal to match the level of the individual color components of the backing,
   (c) removing each color component of the backing by subtracting the level adjusted control signal from the foreground scene video signal,
   (d) forming a clamping signal equal to the lower of the green and red video signals plus a constant times the positive difference of green video minus red video plus a constant times the positive difference of the red video minus the green video,
   (e) subjecting the blue video signal to the said clamping signal such that blue video may be less than but may not exceed the clamping signal, and
   (f) combining the foreground scene video signal, the color components of the backing thereof having been removed, with with the background scene video signal, the level of which has been controlled by the control signal, to form a composite video image.

12. The method of claim 11, in which;
   (a) the clamping signal B has the form:

ti $B \leq (G/R)^{LO} + K_1(G-R)^+ + K_2(R-G)^+$, (b) wherein $(G/R)^{LO}$ designates the lower of green and red, and
   (c) the raised + symbol designates positive value only in the equation.

13. The method of compositing color image video signals involving background scene and a foreground scene including a subject before a colored backing, and automatically employing a low-noise control signal for control of the background scene video level and for removal by subtraction of the color components of the colored backing wherein said employment of low-noise control signal technique does not affect the level of the control signal, comprising the method steps of;
   (a) forming a first control signal as a function of the brightness and visibility of the colored backing,
   (b) forming a second control signal solely as a function of the blue content of the foreground scene,
   (c) comparing the first and second control signals, and employing the lower of the two control signals as the selected control signal,
   (d) automatically adjusting the level of the selected control signal to a value having a fixed ratio to the first control signal throughout a range of variation of the second control signal,
   (e) adjusting the level of the selected control signal to match the level of the video representing the color components of the colored backing,
   (f) removing each color component of the colored backing by subtraction of the adjusted selected control signal from the foreground scene video signal, and
   (g) combining the foreground scene video signal, the color components of the backing thereof having been removed, with the background scene video signal, the level of which has been controlled by the selected control signal, to form a composite video image.

14. The method of claim 13, in which;
   (a) the control signal $E_c$ has the form;

$E_c = (E_b - f(R/G)$ AND $K_6 E_b$, (b) wherein $E_b$ has the form;

$$E_b = \left[1 + \frac{R6}{R5}\right] \left[\frac{R_2 + K_3 R_3}{R_1 + R_2 + K_3 R_3}\right] - K_3 V;$$

(c) f (R/G) has the form;

$f(R/G) = K_4 (K_2 K_r R$ OR $K_g G) + (1 - K_4)(K_2 K_r R$ AND $K_g G)$ (d) the OR designates the larger of $K_2 K_r R$ and $K_g G$; and
   (e) the AND symbol designates the smaller of $K_2 K_r R$ or $K_g G$.

15. The method of compositing color image video signals involving a foreground scene a subject before a colored backing and a background scene when the color of one or more areas within the subject outline is identical to the color of the backing and where said color is retained as non-transparent, and which comprises the method steps of;
   (a) forming a control signal as a function of the brightness and visibility of the colored backing and of subject areas having a similar color,
   (b) forming a window signal of varying shape and size that may be placed anywhere within the scene,
   (c) adjusting the control signal level to match the level of the foreground scene video signal in the region of the colored backing,
   (d) removing the color components of the backing by subtracting the adjusted control signal from the foreground scene video signal,
   (e) controlling the background scene video level with the control signal,
   (f) encompassing the blue portion of the subject with a window signal,
   (g) using the window signal to inhibit the control signal from rising above zero in the area encompassed by the window signal, and
   (h) combining the foreground scene video signal, the color components of the backing thereof having been removed, with the background scene video signal, the level of which has been controlled by the control signal as inhibited by the window signal, to form a composite video image wherein the foreground subject is not transparent in areas where the subject color was that of the backing.

16. The method of claim 12, in which;
the window signal is externally generated.

17. The method in claim 12, in which;
removal of color components of the backing color, or subject areas having the backing color, is inhibited by the window signal in the area of the scene defined by the boundaries of the window so as to retain the original color of the subject.

18. The method of claim 12, in which;
selected voltages under control of both the window signal and the control signal replace the backing color within the area defined by the window signal in porportion to the control signal level existing within the boundaries of the window signal.

19. The method of compositing color image video signals involving a foreground scene including a subject before a colored backing-and a background scene and a title video signal to be superimposed over the composite scene whereby the title appears to be fully transparent and self-luminous, which comprises the method steps of;
   (a) forming a control signal as a function of the brightness and visibility of the colored backing.
   (b) adjusting the level of the control signal to match the level of the video signal for each color component of the colored backing,
   (c) removing each color component of the backing by subtraction of the adjusted control signal from the foreground scene video signal,
   (d) controlling the level of the background scene video signal as a function of the control signal level,
   (e) adjusting the video level of the title video signal to a desired level,
   (f) combining by simple addition the foreground scene video signal, the color components of the backing thereof having been removed, with the background scene video signal, the level of which has been controlled by the control signal, and with the title video signal, adjusted for a desired brightness to form a composite image of title, foreground subject and background scene.

20. The method of claim 19, in which the title is placed behind the foreground subject, comprising the additional method steps of;
   employing the control signal to inhibit the title video signal in the subject area.

21. The method of claim 19 in which;
   the title is colored by adding unequal amounts of the title video signal in the combining process whereby said foreground video, background video and title video signals are combined by simple addition.

22. The method of claim 19, in which the transparency of the title is adjustable, comprising the additional method steps of;
   using a portion of the title signal to reduce the video level of the foreground and background scenes where said reduction is proportional to the level of title signal used.

23. The method of claim 19, in which;
   the title video signal includes the video signal of an out of focus, enlarged bright area of the general shape of the subject.

24. An electronic apparatus for compositing color image video signals involving a foreground scene including a subject disposed before a colored backing and a background scene, which comprises;
   (a) a source of foreground video signals (1,2,3) containing the red, green and blue color components of a foreground scene,
   (b) a source of background video signals (4,5,6),
   (c) means for clamping the blue foregound signal as a function of the red and green foreground signals (11),
   (d) means for generating a control signal proportional to the brightness and visibility of the colored backing (14),
   (e) automatic means for adjusting the control signal level (28,27,24,21) to match the video signal level of the individual color components of the backing on each line of video,
   (f) means for subtracting (7,9,12) the level matched control signal from the foreground video color signals to result in zero for each line of video representing the colored backing,
   (g) means for controlling (15,16,17) the level of the background scene video signal as a linear function of the control signal,
   (h) means for combining (8,10,13) the foreground scene video signal, the color components of the backing thereof having been removed independently on each line of video, with the background scene video signal, the level of which has been controlled by the control signal.

25. The apparatus of claim 24 in which;
   the amount of the adjustment of control signal by the automatic means (24,27) from one line to the next is adjustable (28A).

26. An electronic apparatus for compositing color image video signals involving a foreground scene including a subject disposed before a colored backing and a background scene, which comprises;
   (a) means for generating a foreground video signal (1,2,3) containing the red, green and blue color components of a foreground scene,
   (b) means for generating a background video signal (4,5,6),
   (c) means for clamping the blue component of the foreground video signal as a function of the red and green components of the foreground video signal (11),
   (d) means for generating a control signal proportional to the brightness and visibility of the colored backing (14),
   (e) automatic means (21,37,31) for adjusting the control signal level independently for each color component of the backing so as to match the level of the color components of the foreground and background video signals instataneously and continuously along each line of video,
   (f) means for substracting (7,9,12) the level matched control signal from the foreground video signal to result in zero for each line of video representing the colored backing,
   (g) means for controlling (15,16,17) the level of the background scene video signal as a linear function of the control signal,
   (h) means for combining (8,10,13) the foreground scene video signal, the color components of the backing thereof having been removed independently and continuously along each line of video, with the background scene video signal, the level of which has been controlled by the control signal.

27. The apparatus of claim 26 in which;
   the amount by which the automatic and continuous adjustment of the control (27,31) can vary is subject to manually set limits (21, 34).

28. An electronic apparatus for compositing color image video signals involving a foreground scene including a subject disposed before a colored backing, and a ground scene, which comprises;
   (a) means for generating a foreground video signal (1,2,3) containing the red, green and blue color components of a foreground scene,
   (b) means for generating a background video signal (4,5,6), (c) means (54) for continuously and automatically selecting the lower of the foreground green and red video signals, (d) means for adding to the selected lower video signal a portion of the difference between the red and green video signals (57,58), to form a clamping signal (59), (e) means for limiting (60) the foreground blue video signal to a value that does not exceed the clamping signal, (f) means for generating a control signal proportional to the brightness and visibility of the colored backing (14), (g) means adjusting the control signal (21) to match the level of the backing color components, (h) means for subtracting (7,9,12) the level matched control signal from the foreground scene video signal to result in zero for each line of video representing the colored backing, (i) means for controlling (15,16,17) the level of the background scene video signal as a linear function of the control signal, (j) means (8,10,13) for combining the foreground scene video signal whose blue component has been subjected to the specified clamp (60) and the color components of the backing thereof having been removed, with the background scene video signal, the level of which has been controlled by the control signal.

29. An electronic apparatus for compositing color image video signals involving a foreground scene including a subject disposed before a colored backing and a background scene, which comprises;
  (a) a source of foreground video signals (1,2,3) containing the red, green and blue color components of a foreground scene,
  (b) a source of background video signals (4,5,6),
  (c) means for clamping the blue foreground signal as a function of the red and green foreground signals (11),
  (d) means for generating a first control signal (69) proportional to the brightness and visibility of the colored backing,
  (e) means (71) for developing a second control signal as a function of the blue signal level of the foreground scene,
  (f) means (71) for adjusting the second control signal level to a value lower than the level of the first control signal, when the signals represent the colored backing,
  (g) means (73) for selecting the lower of the first control signal and the adjusted second control signal,
  (h) automatic means (72,75,76,78,79,80) for holding at a constant level the selected control signal as the level of the second control signal is varied,
  (i) means for controlling the level of the background scene video signal (15,16,17) with the selected control signal,
  (j) means for adjusting the level of the selected control signal to match the levels of the color components of the colored backing (34,27,24), (k) means for subtracting (7,9,12) the adjusted selected control signal from the foreground scene video signal,
  (j) Means for combining (8,10,13) the foreground scene video signal, the color components of the backing thereof having been removed by subtraction (7,9,12) of the selected (73) control signal, with the background scene video signal, the level of which has been controlled by the selected control signal, to form a composite video image.

30. The method of compositing color image background and foreground video signals involving a foreground scene a including subject before a red, blue or green colored backing and a background scene and automatically and simultaneously reducing the color components of the colored backing substantially to zero over its entire surface when said color components are of a different ratio in various areas of the colored backing, comprising the steps of:
  (a) forming a control signal as a function of the brightness and visibility of the colored backing;
  (b) comparing and automatically adjusting the level of the control signal to independently match the video level of each color component of the color backing in all areas of the backing;
  (c) removing each color component of the backing by subtraction of the automatically adjusted control signal from the foreground scene video signal; and
  (d) combining the foreground scene video signal, the color components of all areas of the backing having been removed therefrom, with the background scene video signal, the level of which has been controlled by the control signal, to form a composite image video signal.

31. The method of claim 30 wherein the colored backing is blue and the step of forming the control signal includes the steps of:
  (a) independently adjusting the level of the red and green components of the foreground video signal;
  (b) selecting the larger of the independently adjusted color components of the foreground video signal;
  (c) subtracting the selected color component of the foreground video signal from the blue color component to form the control signal.

32. The method of claim 30 wherein the colored backing is red and the step of forming the control signal includes the steps of:
  (a) independently adjusting the level of the blue and green components of the foreground video signal;
  (b) selecting the larger of the independently adjusted color components of the foreground signal;
  (c) substracting the selected color component of the foreground video signal from the red color component to form the control signal.

33. The method of claim 30 wherein the colored backing is green and the step of forming the control signal includes the steps of:
  (a) independently adjusting the level of the red and blue components of the foreground video signal;
  (b) selecting the larger of the independently adjusted color components of the foreground video signal;
  (c) subtracting the selected color component of the foreground video signal from the green color component to form the control signal.

* * * * *